United States Patent
Lin

(10) Patent No.: US 11,256,378 B1
(45) Date of Patent: Feb. 22, 2022

(54) TOUCH PANEL

(71) Applicant: HannsTouch Solution Incorporated, Tainan (TW)

(72) Inventor: Sheng-Chia Lin, Tainan (TW)

(73) Assignee: HannsTouch Solution Incorporated, Tainan (TW)

( * ) Notice: Subject to any disclaimer, the term of this patent is extended or adjusted under 35 U.S.C. 154(b) by 0 days.

(21) Appl. No.: 17/165,861

(22) Filed: Feb. 2, 2021

(51) Int. Cl.
*G06F 3/044* (2006.01)
(52) U.S. Cl.
CPC .......... *G06F 3/0445* (2019.05); *G06F 3/0446* (2019.05); *G06F 2203/04111* (2013.01)
(58) Field of Classification Search
CPC combination set(s) only.
See application file for complete search history.

(56) References Cited

U.S. PATENT DOCUMENTS

2019/0004624 A1* 1/2019 Zhu ........................ G06F 3/0446
2021/0271367 A1* 9/2021 Park ....................... G06F 3/0443

\* cited by examiner

*Primary Examiner* — Deeprose Subedi
(74) *Attorney, Agent, or Firm* — Winston Hsu

(57) ABSTRACT

The present invention provides a touch panel including a substrate, a first conductive layer, an insulating layer, and a second conductive layer. The first conductive layer is disposed on the substrate, and the first conductive layer includes a first trace extending along a first direction. The insulating layer is disposed on the first conductive layer. The second conductive layer is disposed on the insulating layer and includes a plurality of second traces extending along a second direction. The second traces cross the first trace and are electrically insulated from the first trace, and a width of the first trace is greater than a width of one of the second traces.

13 Claims, 6 Drawing Sheets

TOUCH PANEL

BACKGROUND OF THE INVENTION

1. Field of the Invention

The present invention relates to a touch panel, and more particularly to a touch panel with a bridging structure.

2. Description of the Prior Art

In traditional capacitive touch panels, a plurality of sensing electrodes are used to detect user's touch. In order to transmit signals to or receive signals from the sensing electrodes, the sensing electrodes require a plurality of traces to be electrically connected to the pads for being connected to the outside. However, an electrostatic discharge (ESD) is easily generated from a bridging structure in the conventional touch panel. Specifically, FIG. 1 schematically illustrates a cross-sectional view of a conventional bridging structure. As shown in FIG. 1, the bridging structure 10 is disposed on a substrate 12 and is composed of traces 14, traces 16 and an insulating layer 18, and the traces 14, the insulating layer 18 and the traces 16 are sequentially formed on the substrate 12. In the conventional bridging structure 10, the traces 14 extend along the direction HD1, and the traces 16 extend along the direction HD2 and cross plural traces 14 so as to electrically connect wirings or elements respectively located on both sides of the traces 14. Generally, the number of traces 14 is greater than that of traces 16, and a width of the trace 16 in a direction HD1 is much greater than that of the trace 14 in a direction HD2. Therefore, when one of the traces 16 crosses the traces 14, this trace 16 has a wavy cross-section view that is formed along with the ripple outline formed by these crossed traces 14. Due to the influence of process conditions and materials, the corners formed by the top surfaces and the sidewalls of the traces 14 and the top surface of the insulating layer 18 may not have good smoothness while forming the traces 14 and the insulating layer 18. Accordingly, the ESD (as shown by explosion patterns in FIG. 1) or break easily occurs at the upper and lower turning parts of the traces 16 formed on the insulating layer 18, resulting in poor products.

SUMMARY OF THE INVENTION

According to an embodiment of the present invention, a touch panel is provided and includes a substrate, a first conductive layer, an insulating layer, and a second conductive layer. The first conductive layer is disposed on the substrate, and the first conductive layer includes a first trace extending along a first direction. The insulating layer is disposed on the first conductive layer. The second conductive layer is disposed on the insulating layer and includes a plurality of second traces extending along a second direction. The second traces cross the first trace and are electrically insulated from the first trace, and a width of the first trace is greater than a width of one of the second traces.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
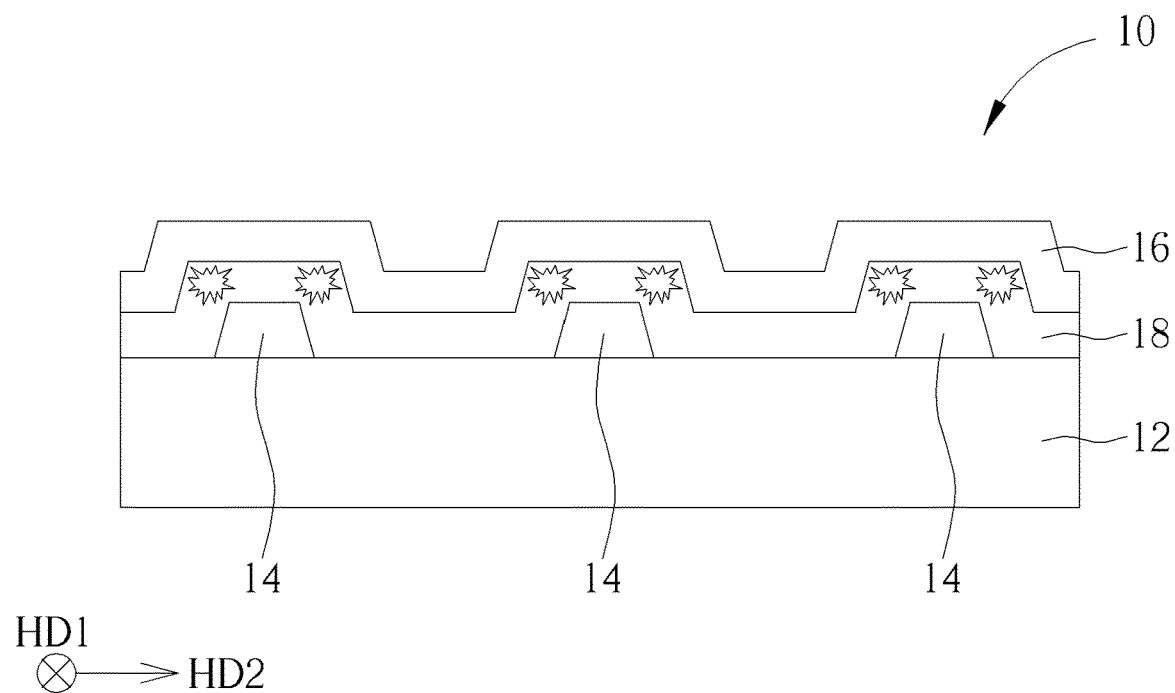
FIG. 1 schematically illustrates a cross-sectional view of a conventional bridging structure.

The contents of the present invention will be described in detail with reference to specific embodiments and drawings. It is noted that, for purposes of illustrative clarity and being easily understood by the readers, the following drawings may be simplified schematic diagrams, and elements therein may not be drawn to scale. The numbers and dimensions of the elements in the drawings are just illustrative, and are not intended to limit the scope of the present invention.

When ordinal numbers, such as "first" and "second", used in the specification and claims are used to modify elements in the claims, they do not mean and represent that the claimed elements have any previous ordinal numbers, nor do they represent the order of a claimed element and another claimed element, or the order of manufacturing methods. These ordinal numbers are just used to distinguish a claimed element with a certain name from another claimed element with the same name.

In a bridging structure of the present invention, a trace with wider width is disposed between a substrate and another trace with less width, such that surface flatness formed by the lower trace may be improved, and turning range or turning length of ups and downs of the upper trace may be reduced. Accordingly, degree of ESD generated from the bridging structure and/or the break of the upper trace may be mitigated. In the present invention, the bridging structure may be applied to various devices that require bridging, for example, applied to a touch panel, a display device or other suitable devices.

Figure 2:
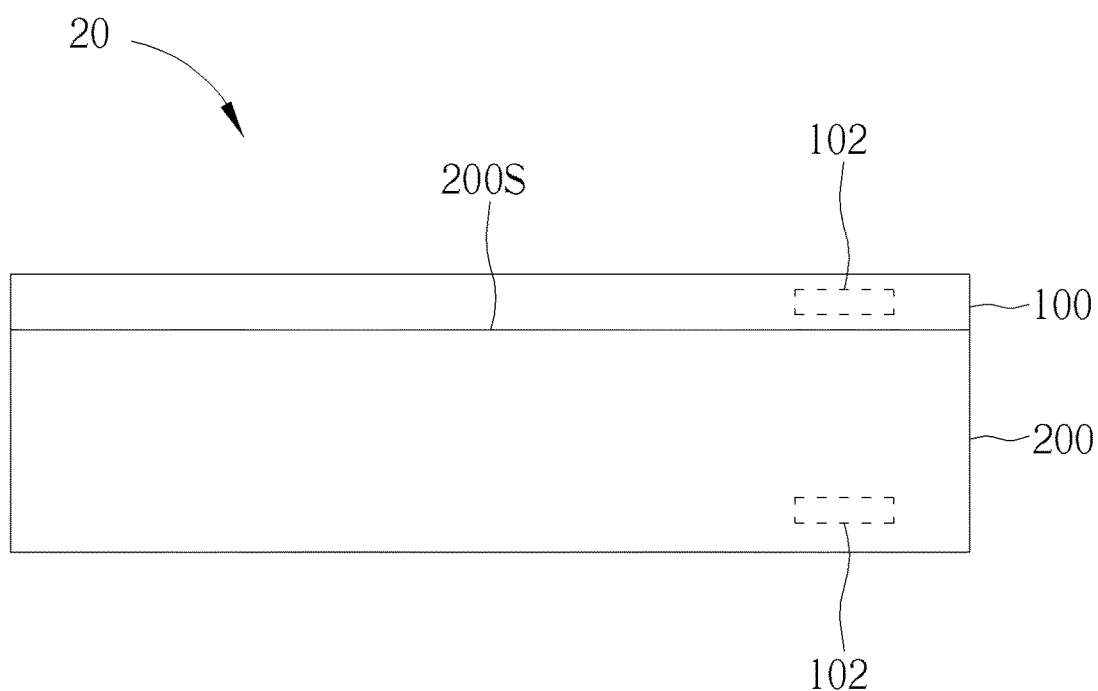
FIG. 2 schematically illustrates a cross-sectional view of a touch display device according to an embodiment of the present invention.

FIG. 2 schematically illustrates a cross-sectional view of a touch display device according to an embodiment of the present invention. As shown in FIG. 2, the touch display device 20 provided in this embodiment may include a touch panel 100 and a display device 200, and the touch panel 100 is disposed on the display surface 200S of the display device 200 for detecting position of the touch display device 20 where the touch object touches or is close to. In one embodiment, at least one bridging structure 102 may be disposed in the touch panel 100. In another embodiment, at least one bridging structure 102 may be located in the display device 100. In another embodiment, the bridging structure 102 may be disposed in both the touch panel 100 and the display device 200. The bridging structure 102 herein may be applied to any of the following embodiments of the bridging structures.

Figure 3:
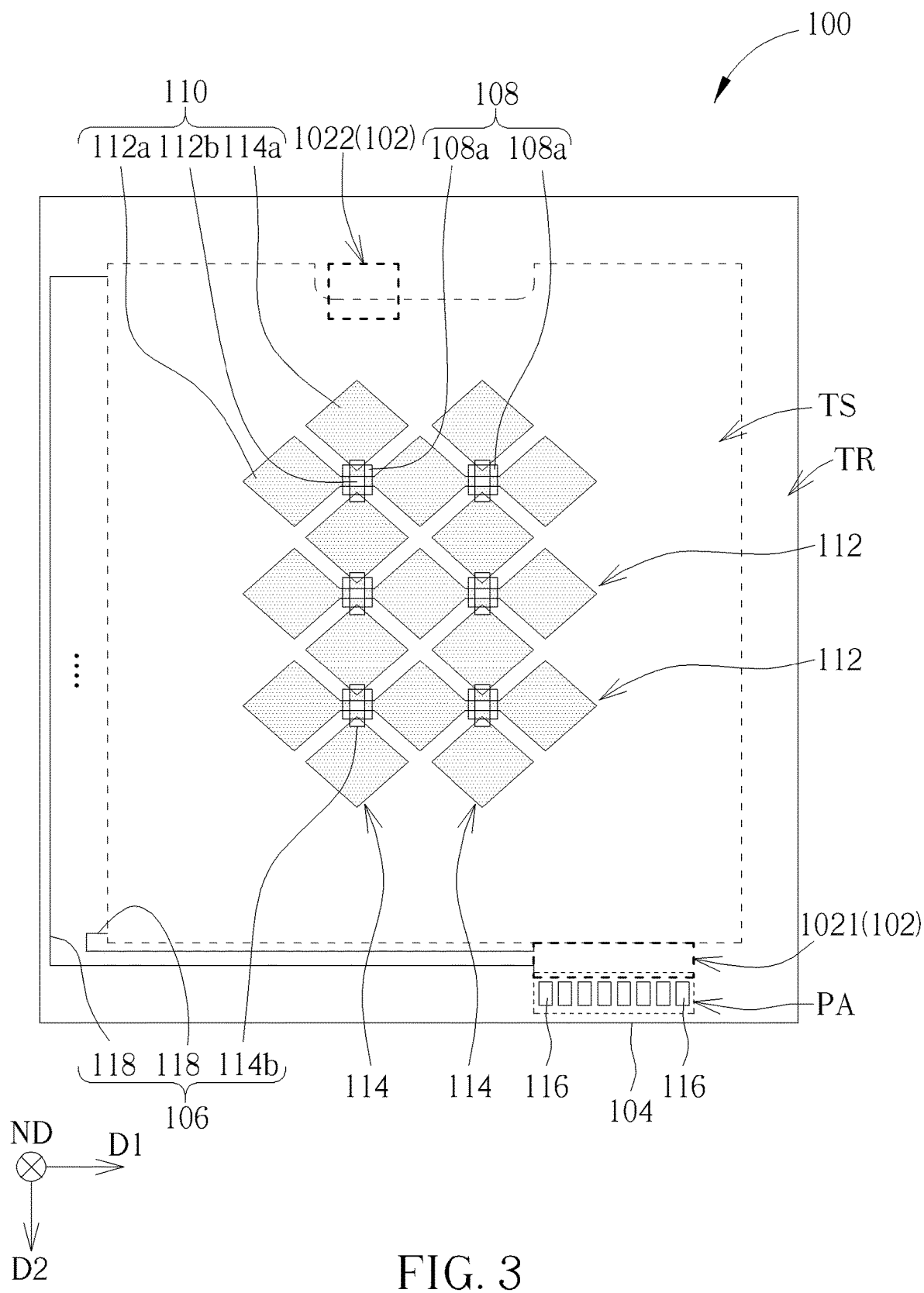
FIG. 3 schematically illustrates a top view of a touch panel according to an embodiment of the present invention.
Figure 4:
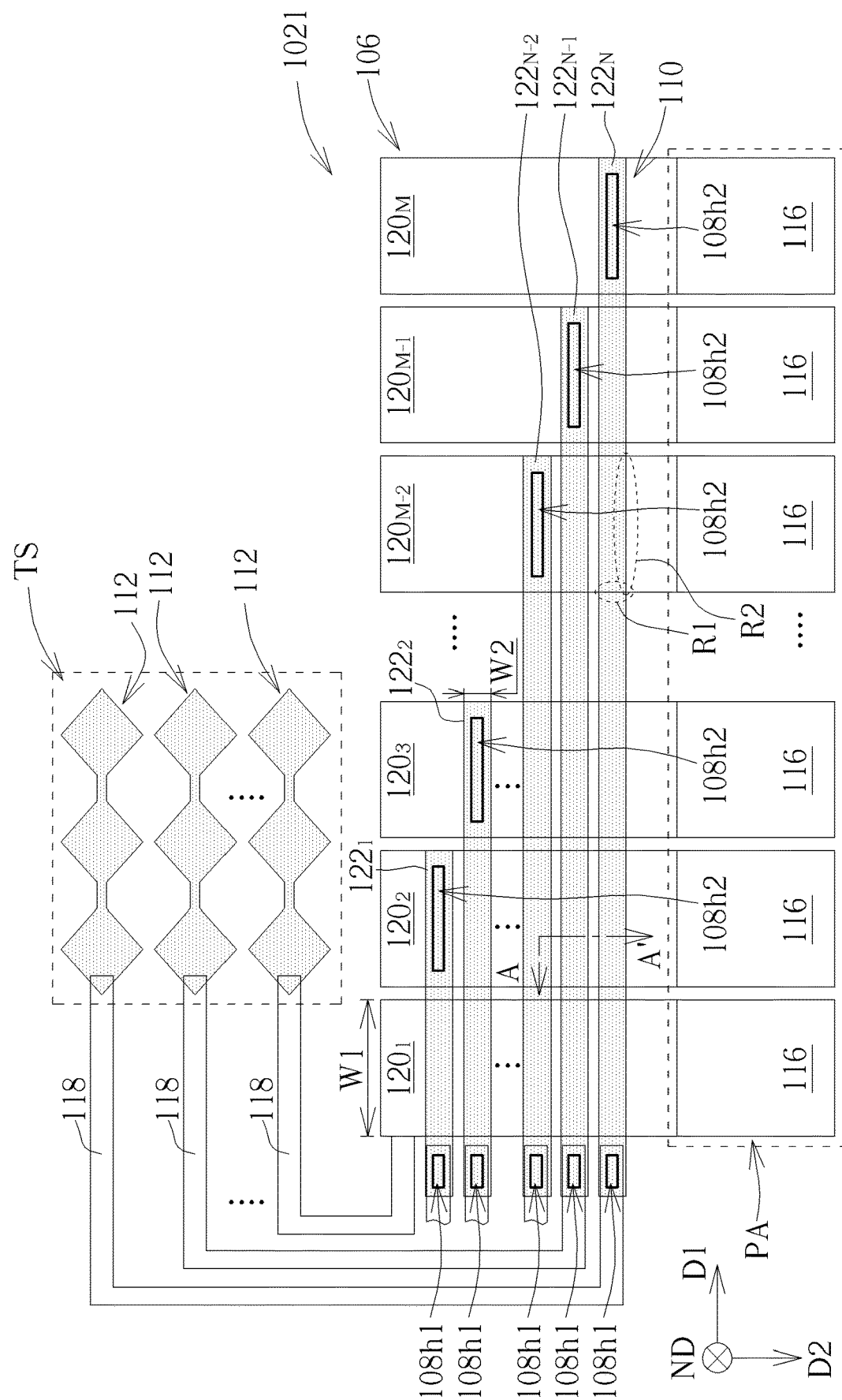
FIG. 4 schematically illustrates an enlarged view of a bridging structure in FIG. 3.
Figure 5:
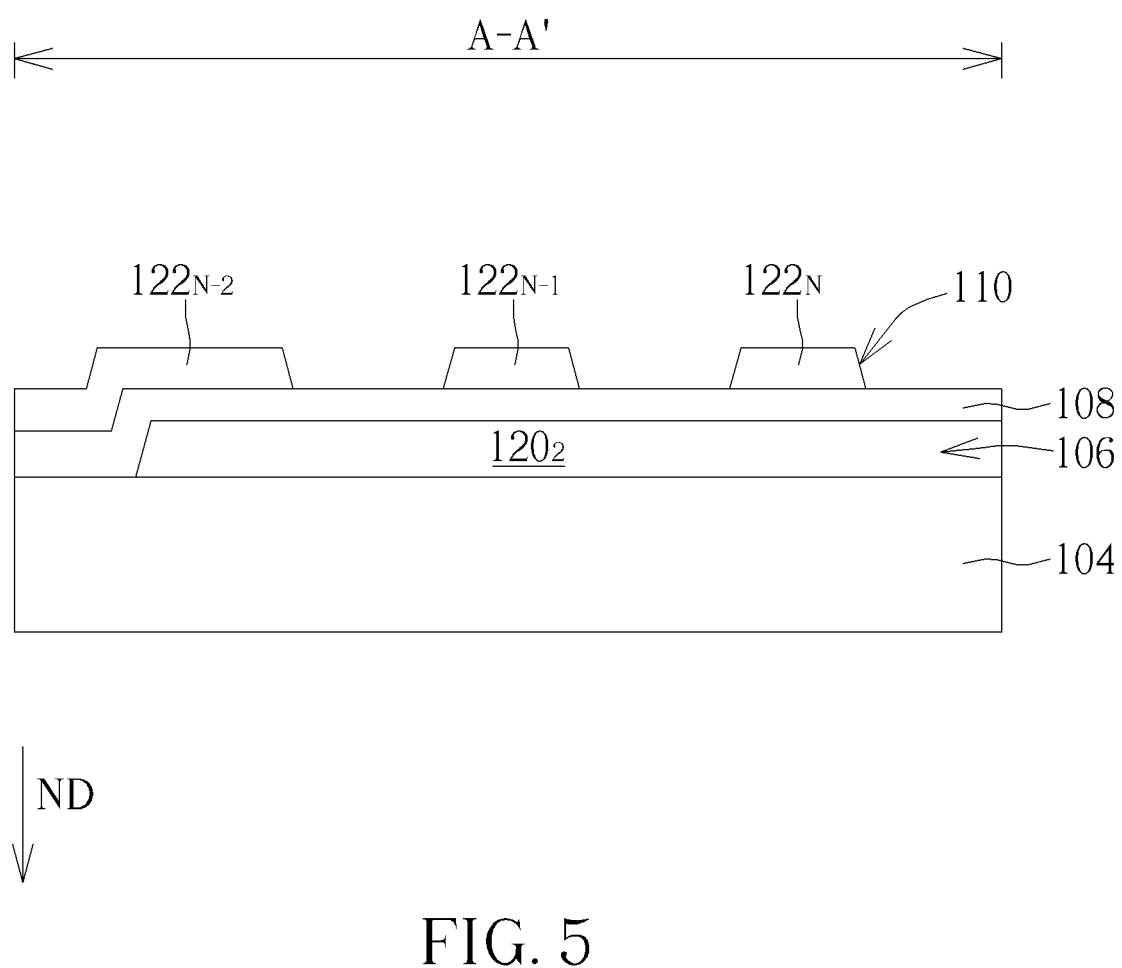
FIG. 5 schematically illustrates a cross-sectional view taken along a cross-sectional line A-A' of FIG. 4.

Hereinafter, the bridging structure 102 disposed in the touch panel 100 is taken as an example for further details, but not limited herein. FIG. 3 schematically illustrates a top view of a touch panel according to an embodiment of the present invention, FIG. 4 schematically illustrates an enlarged view of a bridging structure in FIG. 3, and FIG. 5 schematically illustrates a cross-sectional view taken along a cross-sectional line A-A' of FIG. 4. As shown in FIG. 3, when viewed from a top view direction ND of the touch panel 100, the touch panel 100 may have a touch region TS and a trace region TR, wherein the touch region TS may be used to dispose touch sensing element for detecting a touch object, and the trace region TR may be used to dispose wirings, traces, pads or other suitable elements for being electrically connected to the touch sensing element and the outside. The trace region TR may for example be disposed on at least two sides of the touch region TS, but not limited to this. In one embodiment, when the touch panel 100 is applied to a display device, the touch region TS may be substantially the same as or slightly greater than the display region of the display device, but is not limited thereto.

Specifically, as shown in FIG. 3 and FIG. 5, the touch panel 100 may include a substrate 104, a first conductive layer 106, an insulating layer 108, and a second conductive layer 110, and the first conductive layer 106, the insulating layer 108, and the second conductive layer 110 are sequentially disposed on the substrate 104. The substrate 104 may include a rigid substrate or a flexible substrate. The substrate 104 may include, for example, glass, polyimide (PI) or other suitable materials, but not limited thereto. The top view direction ND of the touch panel 100 may be, for example, perpendicular to a top surface of the substrate 104. The first conductive layer 106, the insulating layer 108, and the second conductive layer 110 may form the touch sensing element for detecting the position where the touch object touches or is close to. In this embodiment, the first conductive layer 106 may include, for example, metal, metal alloy, or other suitable opaque conductive materials. The second conductive layer 110 may include, for example, a transparent conductive material, and the transparent conductive material may include, for example, indium tin oxide (ITO), indium zinc oxide (IZO), antimony tin oxide (ATO), aluminum zinc oxide (AZO), graphene or other suitable materials, but not limited thereto. By first forming the first conductive layer 106 including the opaque conductive material on the substrate 104, the alignment accuracy of patterning the insulating layer 108 and the second conductive layer 110 may be improved, but not limited to thereto. In some embodiments, the first conductive layer 106 may include the transparent conductive material, and the second conductive layer 110 may include the opaque conductive material or the transparent conductive material. Alternatively, when the first conductive layer 106 includes the opaque conductive material, the second conductive layer 110 may also include the opaque conductive material. In this case, the second conductive layer 110 may have a light-transmissive structure in the touch region TS. In order not to affect images displayed by the display device, the second conductive layer 110 may include, for example, a metal mesh.

In the embodiment shown in FIG. 3, the touch sensing element may include a plurality of first sensing strings 112 and a plurality of second sensing strings 114. The first sensing strings 112 extend along a direction D1, the second sensing strings 114 extend along another direction D2 and cross the first sensing strings 112, and the first sensing strings 112 are insulated from the second sensing strings 114 by the insulating layer 108, such that the first sensing strings 112 may be capacitively coupled with the second sensing strings 114, thereby possessing touch sensing function. In other words, the touch sensing element may be, for example, a mutual-capacitive type, but not limited thereto. In some embodiments, the touch sensing element may be other types, such as self-capacitive, resistive, or other suitable types.

In one embodiment, the first sensing strings 112 may include a plurality of first sensing pads 112a and a plurality of first bridging lines 112b, and adjacent first sensing pads 112a arranged in the direction D1 are electrically connected by one of the first bridging lines 112b, such that the first sensing pads 112a and the first bridging lines 112b arranged in the direction D1 are serially connected to form one of the first sensing strings 112. The second sensing strings 114 may include a plurality of second sensing pads 114a and a plurality of second bridging lines 114b. Adjacent second sensing pads 114a arranged in the direction D2 are electrically connected by one of the second bridging lines 114b, such that the second sensing pads 114a and the second bridging lines 114b arranged in the direction D2 are serially connected to form one of the second sensing strings 114, and while viewed along the top view direction ND of the touch panel 100, the second bridging lines 114b of the second sensing strings 114 may cross the first bridging lines 112b of the first sensing strings 112. In addition, the insulating layer 108 may, for example, include a plurality of insulating blocks 108a separated from each other, and each of which is respectively disposed between the corresponding first bridging line 112b and the corresponding second bridging line 114b that cross each other, but not limited thereto. In some embodiments, the insulating blocks 108a may be connected to each other to form a whole insulating layer 108.

In the embodiment of FIG. 3, the second bridging lines 114b may be formed of the first conductive layer 106, and the first sensing pads 112a, the second sensing pads 114a, and the first bridging lines 112b may be formed of the second conductive layer 110, but not limited thereto. Those skilled in the art should know that the first sensing pads 112a and the second sensing pads 114a may be formed of the first conductive layer 106 and/or the second conductive layer 110, as long as the first bridging lines 112b and the second bridging lines 114b cross each other are formed of different conductive layers and electrically insulated from each other by the insulating layer 108, but not limited thereto.

As shown in FIG. 3, the trace region TR may include a pad region PA, and the touch panel 100 may include a plurality of pads 116 disposed in the pad region PA, so that the touch sensing element may be electrically connected to external components through the pads 116, for example electrically connected to a flexible circuit board and a control component, but not limited thereto. In one embodiment, at least a part of one of the pads 116 may be formed of the first conductive layer 106, but not limited thereto. In addition, the first conductive layer 106 may further include a plurality of third traces 118 disposed on the substrate 104 in the trace region TR, and the first sensing strings 112 and the second sensing strings 114 are electrically connected to the pads 116 in the pad region PA by the third traces 118. In One end of one of the third traces 118 may be electrically connected to one end of one of the first sensing strings 112 and the second sensing strings 114, and the other end of this third trace 118 may be adjacent to the pad region PA. Although FIG. 3 just illustrates that the third traces 118 are electrically connected to the first sensing strings 112 extending along the direction D1, the third traces 118 of the present invention are not limited to this. In some embodiments, the first conductive layer 106 may further include a plurality of other third traces 118 electrically connected to the corresponding second sensing strings 114 respectively. In some embodiments, the first conductive layer 106 may further include a plurality of other third traces 118, such that both ends of each of the first sensing strings 112 and/or the second sensing strings 114 may be electrically connected to the pad region PA through different traces 118, but not limited thereto. In some embodiments, the third traces 118 may be formed of another conductive layer, such as the second conductive layer 110 or a conductive layer different from the first conductive layer 106 and the second conductive layer 110.

As shown in FIG. 3, the bridging structure 102 of the touch panel 100 may include a bridging structure 1021, such that the third traces 118 may be electrically connected to the pads 116 by the bridging structure 1021. By means of the bridging structure 1021, the third traces 118 may extend to the bridging structure 1021 without crossing each other, but not limited thereto. Specifically, as shown in FIG. 4 and FIG. 5, in the bridging structure 1021, the first conductive layer 106 may include a plurality of first traces $120_1$-$120_M$ extending along the direction D2 into the pad region PA to be connected to the corresponding pads 116 respectively, where M may be a positive integer. The second conductive layer 110 may include a plurality of second traces $122_1$-$122_N$ extending along the direction D1, where N may be a positive integer. In the embodiment of FIG. 4, the third traces 118 are electrically connected to the corresponding first traces $120_2$-$120_M$ by the corresponding second traces $122_1$-$122_N$ respectively, so that the third traces 118 may be electrically connected to the corresponding pads 116 through the corresponding first traces $120_1$-$120_M$ and the corresponding second traces $122_1$-$122_N$. For example, one of the third traces 118 is electrically connected to the first trace $120_2$ by the second trace $122_1$, another one of the third traces 118 is electrically connected to the first trace $120_3$ by the second trace $122_2$, and so on. In addition, the third trace 118 electrically connected to the first trace $120_1$ may be directly connected to the first trace $120_1$ without the second traces $122_1$-$122_N$. The first trace $120_1$ and the third trace 118 connected to each other may be for example formed of the same conductive layer, but not limited thereto. In this case, the number of the first traces $120_1$-$120_M$ may be different from the number of the second traces $122_1$-$122_N$; that is, M may be different from N, for example, M is N+1. The configuration of the present invention is not limited to this. In some embodiments, the first trace $120_1$ may be electrically connected to the third trace 118 through another second trace. In this case, M may be the same as N.

In the embodiment shown in FIG. 4, when viewed along the top view direction ND of the touch panel 100, the first traces $120_1$-$120_M$ may be arranged in the direction D1 in sequence, so that the first traces $120_1$-$120_M$ may be spaced from the third traces 118 from near to far in sequence. Accordingly, the second traces $122_1$-$122_N$ electrically connected to the first traces $120_2$-$120_M$ respectively may have different lengths. As shown in FIG. 4, the second traces $122_1$-$122_N$ may be sequentially arranged along the direction D2, for example, but not limited thereto. In the present invention, the connection between the second traces $122_1$-$122_N$ and the first traces $120_2$-$120_M$ is not limited to this. In some embodiments, the second traces $122_1$-$122_N$ may be sequentially arranged along a direction opposite to the direction D2. For example, the direction D1 may be perpendicular to the direction D2, but not limited thereto. In some embodiments, the direction D1 may not be parallel or perpendicular to the direction D2.

In the embodiment shown in FIG. 4, one of the second traces $122_1$-$122_N$ may cross at least one of the first traces $120_1$-$120_M$ and be electrically insulated from the others of the first traces $120_1$-$120_M$ by the insulating layer 108 (as shown in FIG. 5). Furthermore, one of the second traces $122_1$-$122_N$ may cross the others of the first traces $120_1$-$120_M$ between one of the first traces $120_1$-$120_M$ electrically connected to the one of the second traces $122_1$-$122_N$ and the third traces 118. For example, the second trace $122_1$ crosses the first trace $120_1$ between the first trace $120_2$ electrically connected to the second trace $122_1$ and the third traces 118, the second trace $122_2$ crosses the first trace $120_1$ and the first trace $120_2$ between the first trace $120_3$ electrically connected to the second trace $122_2$ and the third traces 118, and so on. The second trace $122_N$ may cross the first trace $120_1$ to the first traces $120_{(M-1)}$ between the first trace $120_M$ electrically connected to the second trace $122_N$ and the third traces 118, and only the first trace $120_M$ electrically connected to the second trace $122_N$ closest to the pad region PA is not crossed by other second traces $122_1$-$122_{(N-1)}$. In the embodiment shown in FIG. 4, parts of the second traces $122_1$-$122_N$ crossing the corresponding first traces $120_1$-$120_M$ are disposed between the touch region TS and the pad region PA; that is, the bridging structure 1021 may be disposed between the touch region TS and the pad region PA, but the present invention is not limited to this.

As shown in FIG. 4, the insulating layer 108 may further include a plurality of contact holes 108h1 and a plurality of contact holes 108h2, so that each of the second traces $122_1$-$122_N$ may be electrically connected to the corresponding third traces 118 through the corresponding contact holes 108h1 respectively, and each of the second traces $122_1$-$122_N$ may be electrically connected to the corresponding first traces $120_2$-$120_M$ through the corresponding contact holes 108h2 respectively. In this embodiment, the closer to the third traces 118 the contact holes 108h2 are, the larger the distances between the contact holes 108h2 and the pad region PA are, so that a plurality of second traces $122_1$-$122_N$ crossing one of the first traces $120_2$-$120_M$ may be disposed between the contact hole 108h2 corresponding to this crossed first trace and the pad region PA. For example, the second traces $122_3$ to $122_N$ crossing the first trace $120_2$ are disposed between the contact hole 108h2 corresponding to the first trace $120_2$ and the pad region PA, and so on. The locations of the contact holes of the present invention are not limited to this, and may be adjusted according to the connection between the second traces $122_1$-$122_N$ and the first traces $120_2$-$120_M$.

It should be noted that in this embodiment, since the bridging structure 1021 located in the trace region TR and the touch sensing element located in the touch region TS may be formed of the first conductive layer 106, the second conductive layer 110 and the insulating layer 108, the formation of the bridging structure 1021 does not increase the production cost. For example, the first traces $120_1$-$120_M$ of the bridging structure 1021 are preferably formed of the same first conductive layer 106 as at least one of the first sensing pads 112a, the second sensing pads 114a, and the first bridging lines 112b of the touch sensing element, and the second traces $122_1$-$122_N$ of the bridging structure 1021 are preferably formed of the same second conductive layer 110 as the second bridging lines 114b of the touch sensor element. The present invention is not limited to this. In other embodiments, at least one of the first traces $120_1$-$120_M$ and the second traces $122_1$-$122_N$ in the bridging structure 1021 may be formed of another conductive layer different from the first conductive layer 106 and the second conductive layer 110.

In addition, as shown in FIG. 4 and FIG. 5, a width of one of the first traces $120_1$-$120_M$ (e.g., a width W1 in the direction D1) may be greater than a width of one of the second traces $122_1$-$122_N$ (e.g., a width W2 in the direction D2). The width W1 may be much greater than the width W2. For example, a ratio of the width W1 to the width W2 may range from 2 to 10, preferably from 3 to 6, but is not limited thereto. Therefore, as compared to top surfaces of the second traces $122_1$-$122_N$, top surfaces 120S of the first traces $120_1$-$120_M$ may have a flatter profile or a higher flatness. In this way, by disposing the first traces $120_1$-$120_M$ between the second traces $122_1$-$122_N$ and the substrate 104, parts of uneven surface where the traces encounter height difference may be effectively mitigated. Taking the second trace $122_N$ and the first trace $120_{(M-2)}$ as an example, when the first trace $120_{(M-2)}$ is disposed under the second trace $122_N$, a part of a surface where the second trace 122N encounters the height difference is located for example in the region R1, and when the second trace $122_N$ is located under the first trace $120_{(M-2)}$, a part of a surface where the first trace $120_{(M-2)}$ encounters the height difference is located for example in the region R2. Since a width of the region R1 is less than a width of the region R2, the bridging structure 1021 of the present embodiment may reduce upper and lower turning parts of the traces, thereby mitigating the ESD and/or break caused by the turning parts. Accordingly, the product yield rate may be improved. The bridging structure 1021 mentioned above may be applied to other bridging structures in other devices.

Figure 6:
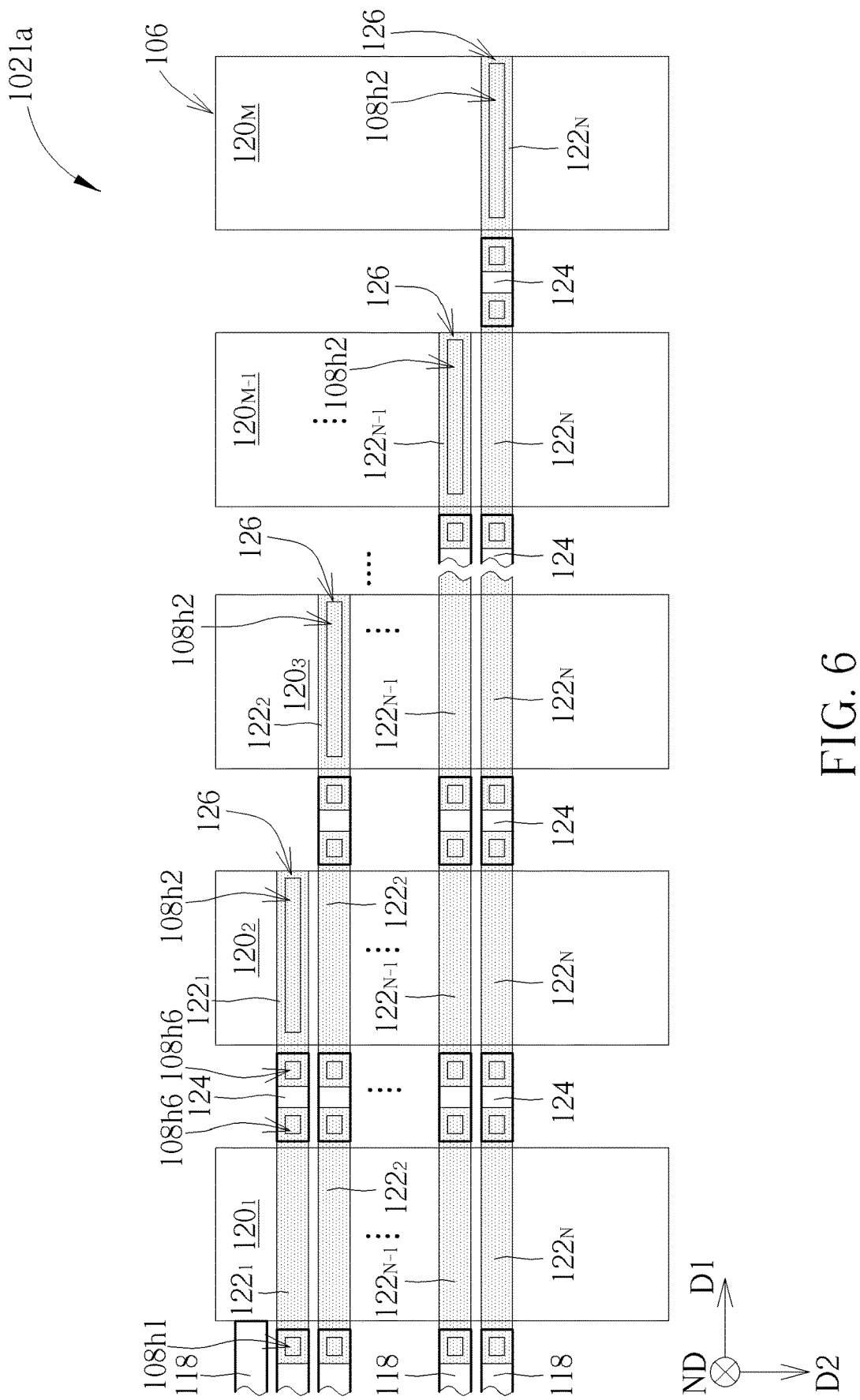
FIG. 6 schematically illustrates an enlarged view of a bridging structure between the touch region and the pad region according to a variant embodiment of the present invention.

FIG. 6 schematically illustrates an enlarged view of a bridging structure between the touch region and the pad region according to a variant embodiment of the present invention. For clarity of illustration, FIG. 6 omits the pads in the pad region and the touch sensing element in the touch region, but the present invention is not limited thereto. As shown in FIG. 6, in the bridging structure 1021a provided in this variant embodiment, the first conductive layer 106 may further include a plurality of fourth traces 124, and one of the fourth traces 124 may be disposed between adjacent two of the first traces $120_1$-$120_M$ and be electrically connected to a corresponding one of the second traces $122_1$-$122_N$. In this case, each of the second traces $122_1$-$122_N$ shown in FIG. 4 may be divided into a plurality of second traces $122_1$-$122_N$, and the second traces $122_1$-$122_N$ may be connected by the fourth traces 124 into a plurality of connection lines 126. As shown in FIG. 6, for example, the second conductive layer 110 may include two second traces $122_1$, three second traces $122_2$, . . . , (M−1) second traces $122_{(N-1)}$, and M second traces $122_N$, but not limited to this. Moreover, the second traces $122_1$ may be electrically connected by a fourth trace 124 to form a connection line 126, the second traces $122_2$ may be electrically connected by two fourth traces 124 to form another connection line 126, and so on. The second traces $122_N$ may be electrically connected by (M−1) fourth traces 124 to form another connection line 126. In addition, other second traces of the second traces $122_1$-$122_N$ except for the second traces corresponding to the contact hole 108h2 may cross the corresponding first traces $120_2$-$120_M$. For example, one of the second traces $122_1$ may cross the first trace $120_1$, two of the second traces $122_2$ may cross the first trace $120_1$ and the first trace $120_2$ respectively, and so on. (M−1) second traces of the second traces $122_N$ may respectively cross the first trace $120_1$ to the first trace $120_{(M-1)}$. One of the second traces $122_1$-$122_N$ of the present invention may not be limited to only cross one of the first traces as shown in FIG. 6. In some embodiments, at least one of the second traces $122_1$-$122_N$ may cross at least two of the first traces. In the variant embodiment of FIG. 6, the insulating layer 108 may further include a plurality of contact holes 108h6, such that the second traces $122_1$-$122_N$ may be electrically connected to the corresponding fourth traces 124 through the corresponding contact holes 108h6.

Figure 7:
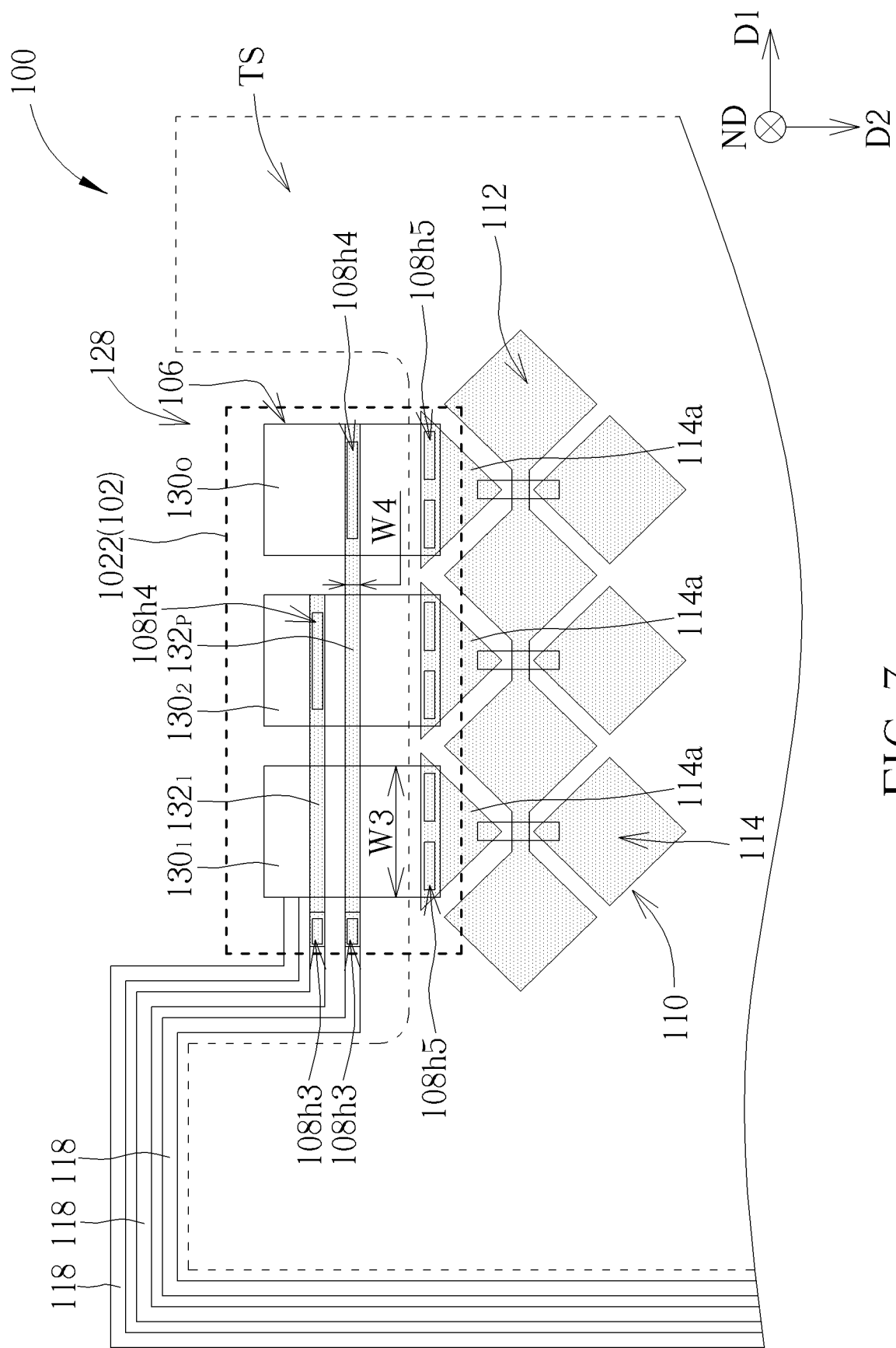
FIG. 7 schematically illustrates an enlarged view of another bridging structure in FIG. 3.

FIG. 7 schematically illustrates an enlarged view of another bridging structure in FIG. 3. As shown in FIG. 7, the touch region TS may optionally have a notch 128, and the bridging structure 102 of the touch panel 100 may further include a bridging structure 1022 located in the notch 128. For example, the touch panel 100 may be applied to a handheld electronic device, such as a mobile phone, so that the touch region TS of the touch panel 100 has the notch 128 in order to meet the display region with a special shape of the display device, but the present invention is not limited thereto. In the handheld electronic device, such as in the mobile phone, there are usually mobile phone lens, detector, etc. disposed in the region of the notch 128. Since the touch region TS has the notch 128, one of the second sensing strings 114 with one end extending to the notch 128 needs to be electrically connected to the corresponding third trace 118 through the bridging structure 1022. Specifically, in the bridging structure 1022, the first conductive layer 106 may further include a plurality of fifth traces $130_1$-$130_O$ extending along the direction D2, and the fifth traces $130_1$-$130_O$ are disposed in the notch 128 and extend from the notch 128 into the touch region TS to be electrically connected to the second sensing pads 114a of the corresponding second sensing strings 114 respectively, where O may be a positive integer, such as 3. The second conductive layer 110 may further include a plurality of sixth traces $132_1$-$132_P$ extending along the direction D1 and crossing the corresponding fifth traces $130_2$-$130_O$, where P may be a positive integer, such as 2.

As shown in FIG. 7, the bridging structure 1022 may be similar to the bridging structure 1021; that is, the fifth traces $130_1$-$130_O$ may be similar to the first traces $120_1$-$120_M$, and the sixth traces $132_1$-$132_P$ may be similar to the second traces $122_1$-$122_N$, with only the difference in number. The bridging structure 1022 of this embodiment is specifically described in the following contents. When O is different from P, each of the sixth traces $132_1$-$132_P$ may be electrically connected to the corresponding third traces 118 and the corresponding fifth traces $130_2$-$130_O$ respectively. Furthermore, the third trace 118 electrically connected to the fifth trace $130_1$ may be directly connected to the fifth trace $130_1$ without the sixth traces. In some embodiments, O may be the same as P, and the fifth trace $130_1$ may be electrically connected to the third trace 118 through another sixth trace. In addition, the third traces 118 may extend along an edge of the touch region TS to another bridging structure (not shown in FIG. 7) for being electrically connected to the pads, but not limited thereto.

In the embodiment shown in FIG. 7, as viewed along the top view direction ND of the touch panel 100, the fifth traces $130_1$-$130_O$ may be spaced from the third traces 118 from near to far in sequence, so the sixth traces $132_1$-$132_P$ may have different lengths. In this embodiment, one of the sixth traces $132_1$-$132_P$ may cross other fifth traces located between one of the fifth traces $130_1$-$130_O$ electrically connected to the one of the sixth traces $132_1$-$132_P$ and the third traces 118, and be electrically insulated from the other fifth traces by the insulating layer 108. In this embodiment, for example, the sixth trace $132_1$ crosses the fifth trace $130_1$ between the fifth trace $130_2$ electrically connected to the sixth trace $132_1$ and the third traces 118, and the sixth trace $132_P$ crosses the fifth trace $130_1$ and the fifth trace $130_2$ between the fifth trace $130_O$ electrically connected to the sixth trace $132_P$ and the third traces 118. In the embodiment shown in FIG. 7, parts of the sixth traces $132_1$-$132_P$ crossing the corresponding fifth traces are disposed in the notch 128, but the present invention is not limited to this.

As shown in FIG. 7, the insulating layer 108 may further include a plurality of contact holes 108h3 and a plurality of contact holes 108h4, so that the sixth traces $132_1$-$122_P$ may be electrically connected to the corresponding third traces 118 through the corresponding contact holes 108h3 respectively and be electrically connected to the corresponding fifth traces $130_2$-$130_O$ through the corresponding contact holes 108h4 respectively. In the embodiment of FIG. 7, when the sensing pad 114a of the second sensing string 114 closest to the notch 128 is formed of the second conductive layer 110, the insulating layer 108 may further include a plurality of contact holes 108h5, such that each of the fifth traces $130_1$-$130_O$ may be electrically connected to the corresponding sensing pad 114a through at least one contact hole 108h5. The contact holes 108h5 may be disposed between the sixth traces $132_1$-$132_P$ and the first sensing strings 112. As viewed along the top view direction ND, the contact holes 108h5 may be, for example, disposed in the touch region TS adjacent to the bottom of the notch 128 or disposed in the notch 128. In addition, the closer to the third traces 118 the contact holes 108h4 are, the farther the distances between the contact holes 108h4 and the corresponding contact holes 108h5 are, and the sixth trace $132_P$ crossing one of the fifth traces $130_1$-$130_O$ may be disposed between the contact hole 108h4 corresponding to the crossed fifth trace and the contact holes 108h5.

In addition, as shown in FIG. 7, a width of one of the fifth traces $130_1$-$130_O$ (e.g., a width W3 in the direction D1) may be greater than a width of one of the sixth traces $132_1$-$132_P$ (e.g., a width W4 in the direction D2). The width W3 may be much greater than the width W4. For example, a ratio of the width W3 to the width W4 may range from 2 to 10, preferably from 3 to 6, but not limited thereto. Therefore, as compared to top surfaces of the sixth traces $132_1$-$132_P$, top surfaces of the fifth traces $130_1$-$130_O$ may have a flatter profile or higher flatness. In this way, by arranging the fifth traces $130_1$-$130_O$ between the sixth traces $132_1$-$132_P$ and the substrate 104, parts of uneven surface where the traces encounter height difference, for example, similar to the second traces $122_{(N-2)}$-$122_N$ and the first trace $120_2$ shown in FIG. 5 may be effectively mitigated. Therefore, the bridging structure 1022 of this embodiment may also reduce the upper and lower turning parts of the traces, thereby mitigating the ESD and/or break caused by the turning parts. Accordingly, the product yield rate may be improved. The bridging structure 1022 described above may be applied to bridging structures in other devices.

It should be noted that in this embodiment, because the bridging structure 1022 located in the trace region TR may be formed of the same first conductive layer 106, second conductive layer 110 and insulating layer 108 as the touch sensing element located in the touch region TS, the formation of the bridging structure 1022 does not increase the production cost. In other embodiments, at least one of the fifth traces $130_1$-$130_O$ and the sixth traces $132_1$-$132_P$ in the bridging structure 1022 may be formed of another conductive layer different from the first conductive layer 106 and the second conductive layer 110.

In some embodiments, the bridging structure 1022 shown in FIG. 7 may adopt the bridging structure shown in FIG. 6, so that one fourth trace 124 may be disposed between adjacent two of the fifth traces $130_1$-$130_O$, and each of the sixth traces $132_1$-$132_P$ may be divided into a plurality of sixth traces $132_1$-$132_P$, and the sixth traces $132_1$-$132_P$ may be electrically connected by the fourth traces 124 to form a plurality of connection lines.

In some embodiments, the touch panel 100 may optionally have the bridging structure 1021 and/or the bridging structure 1022. When the touch panel 100 only has the bridging structure 1022 located in the notch 128, the fifth traces may be the first traces in claims, and the sixth traces may be the second traces in the claims, but not limited thereto.

In summary, in the touch panel of the present invention, by disposing the first trace with the greater width between the substrate and the second traces with the less widths, parts of uneven surface where the traces encounter height difference may be effectively mitigated, thereby reducing the upper and lower turning parts of the traces. Accordingly, the ESD and/or break caused by the turning parts may be mitigated, thereby improving the product yield rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a substrate;
   a first conductive layer disposed on the substrate, wherein the first conductive layer comprises a first trace extending along a first direction;
   an insulating layer disposed on the first conductive layer;
   a second conductive layer disposed on the insulating layer, and the second conductive layer comprising a plurality of second traces extending along a second direction, wherein the plurality of second traces cross the first trace and are electrically insulated from the first trace, a width of the first trace is greater than a width of one of the plurality of second traces, the touch panel has a touch region and a pad region, and parts of the plurality of second traces crossing the first trace are disposed between the touch region and the pad region; and
   another second trace electrically connected to the first trace.

2. The touch panel according to claim 1, wherein the first conductive layer comprises an opaque conductive material, and the second conductive layer comprises a transparent conductive material.

3. The touch panel according to claim 1, further comprising a pad disposed in the pad region, and the first trace is electrically connected to the pad.

4. The touch panel according to claim 1, wherein the insulating layer has a contact hole, the another second trace is electrically connected to the first trace through the contact hole, and the plurality of second traces are disposed between the contact hole and the pad region.

5. The touch panel according to claim 1, wherein the first conductive layer and the second conductive layer comprise a plurality of first sensing strings extending along the first direction and a plurality of second sensing strings extending along the second direction, and the plurality of first sensing strings are insulated from the plurality of second sensing strings by the insulating layer.

6. The touch panel according to claim 5, wherein the first conductive layer comprises a plurality of third traces, and one of the plurality of first sensing strings and the plurality of second sensing strings is electrically connected to a corresponding one of the plurality of second traces through a corresponding one of the plurality of third traces.

7. A touch panel, comprising:
a substrate;
a first conductive layer disposed on the substrate, wherein the first conductive layer comprises a first trace extending along a first direction;
an insulating layer disposed on the first conductive layer;
a second conductive layer disposed on the insulating layer, and the second conductive layer comprising a plurality of second traces extending along a second direction, wherein the plurality of second traces cross the first trace and are electrically insulated from the first trace, and a width of the first trace is greater than a width of one of the plurality of second traces, wherein the touch panel has a touch region, the touch region has a notch, and parts of the plurality of second traces crossing the first trace are disposed in the notch; and
another second trace electrically connected to the first trace.

8. The touch panel according to claim 7, wherein the first conductive layer and the second conductive layer comprise a plurality of first sensing strings extending along the first direction and a plurality of second sensing strings extending along the second direction, and the first trace is electrically connected to one of the plurality of second sensing strings.

9. The touch panel according to claim 8, wherein the insulating layer has at least one contact hole, the first trace is electrically connected to the one of the plurality of second sensing strings through the at least one contact hole, and the at least one contact hole is disposed between the plurality of second traces and the plurality of first sensing strings.

10. The touch panel according to claim 7, wherein the first conductive layer further comprises a plurality of third traces, and one of the plurality of second traces is electrically connected to a corresponding one of the plurality of third traces.

11. The touch panel according to claim 1, wherein the first conductive layer comprises another first trace, and the plurality of second traces cross the first trace and the another first trace.

12. The touch panel according to claim 1, wherein the first conductive layer comprises another first trace and a plurality of fourth traces, the plurality of fourth traces are disposed between the first trace and the another first trace, and one of the plurality of fourth traces is electrically connected to one of the plurality of second traces.

13. The touch panel according to claim 1, wherein a ratio of a width of the first trace to a width of the one of the plurality of second traces ranges from 2 to 10.

* * * * *